March 7, 1950     A. D. OLDS     2,499,523
AIR CIRCULATOR CONTROL FOR HEATING UNITS
Filed Dec. 18, 1944
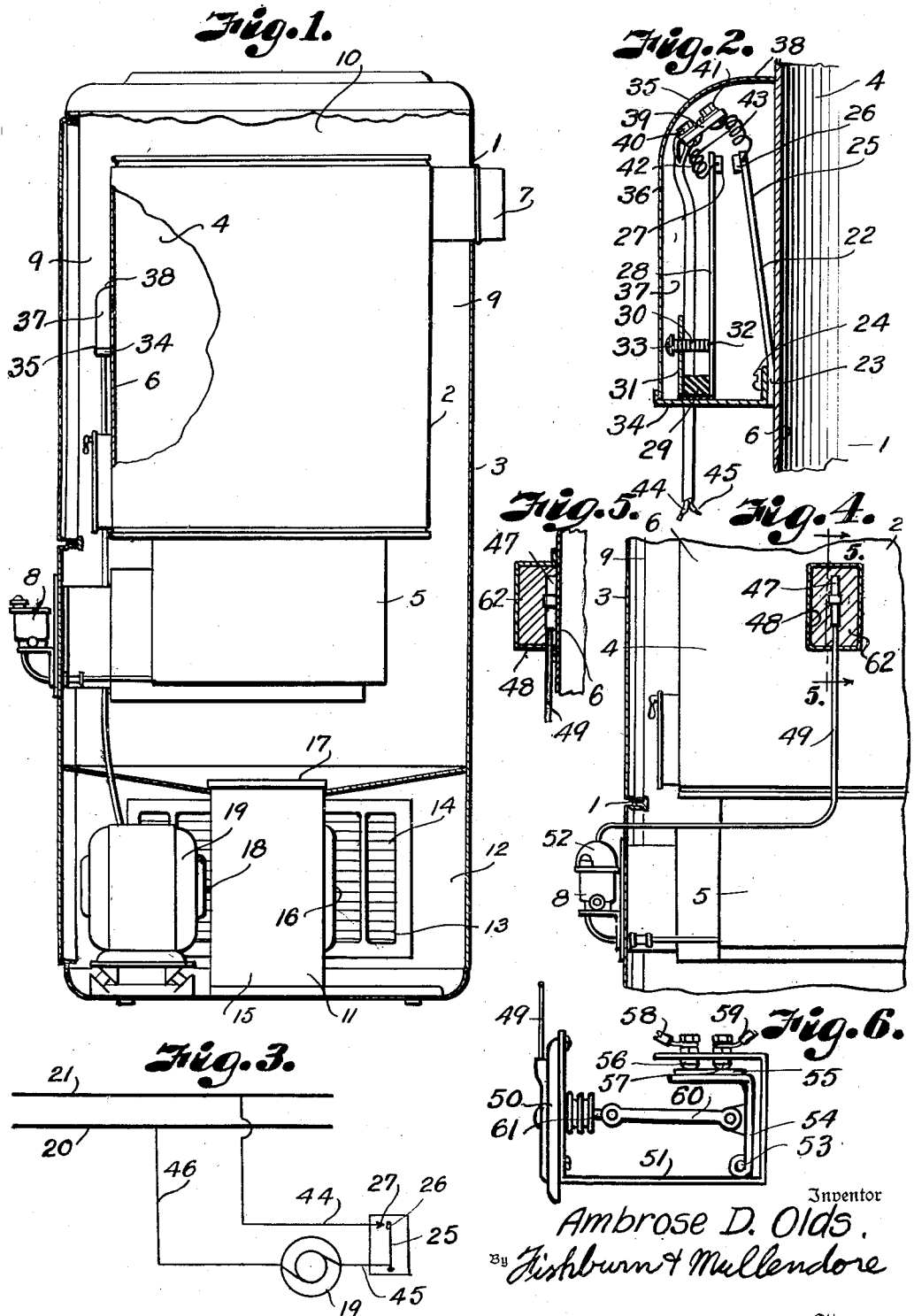
Inventor
Ambrose D. Olds
By Fishburn & Mullendore
Attorneys Patented Mar. 7, 1950

2,499,523

UNITED STATES PATENT OFFICE 2,499,523

AIR CIRCULATOR CONTROL FOR HEATING UNITS

Ambrose D. Olds, Wichita, Kans., assignor to The Coleman Lamp and Stove Company, Wichita, Kans., a corporation of Kansas Application December 18, 1944, Serial No. 568,615

3 Claims. (Cl. 236—10)

This invention relates to air circulating heaters and more particularly to those employing a motor driven air circulator for effecting forced movement of air around the combustion chamber of the heating unit and through the bonnet of the outer casing for discharge to the space being heated.

In heaters of this character the air circulator unit is controlled responsive to temperature of air moving through the bonnet of the heater in such manner that when the bonnet temperature reaces a maximum high during operation of the heater the air circulator is energized to begin forced circulation of the air for absorbing the heat generated and when the temperature of the air moving through the bonnet falls below a predetermined value; for example, which may approach room temperature, the forced circulation is automatically suspended until the next heating cycle. Consequently, the range in temperature utilized in controlling the air circulator is relatively small when it is considered that the maximum bonnet temperature is around 160° F. and the room temperature is approximately 70° F. so that the control unit must operate within a 90° differential. This low differential requires thermostats having sensitive parts and complicated electrical systems involving relays for operating the motor circuit of the air circulator unit. It is also difficult to obtain positive response of the control mechanism and the turbulence of the moving air causes considerable variation in the operation of the thermostat. Another difficulty is that such thermostats are slow to respond and it is difficult to begin the circulating cycle at a definite temperature and to end the circulating cycle when the temperature falls after suspension of the heating cycle. Usually the inoperative periods are so long that the air in the space heated stratifies with the hot air rising to the ceiling and causing the air in the living space and on the floor to be too cool for comfort although the air in the upper region of the room is extremely warm and not usable for comfort until the fan or blower is again brought into operation.

It is, therefore, the principal object of the present invention to provide a more substantial and positive control apparatus which is adapted to respond to combustion chamber temperature as distinguished from the temperature of the circulated air.

A further object of the invention is to provide a control apparatus to reduce the time interval between operating periods of the air circulator and which is capable of effecting a quick start of the air circulator unit, thereby maintaining more uniform temperature during the intervals between operating periods of the heater unit which are under control of the room thermostat.

A further object of the invention is to provide a free blade thermostat when metallic blades are employed, that is, a thermostat blade that is not under tension when the furnace is out of operation.

In accomplishing these and other objects of the invention hereinafter pointed out, I have provided improved structure, the preferred forms of which are illustrated in the accompanying drawing wherein:

Fig. 1 is a vertical section through the casing of a heater unit and air circulator control apparatus constructed in accordance with the present invention.

Fig. 2 is an enlarged section through the thermostatic switch of the control apparatus and illustrating mounting thereof in direct heat conductive relation with the combustion chamber of the heating unit.

Fig. 3 is a wiring diagram of the control apparatus and current supply therefor.

Fig. 4 is a fragmentary section through a circulating heater showing a modified form of control apparatus.

Fig. 5 is a fragmentary section on the line 5—5 of Fig. 4.

Fig. 6 is a side elevational view of the diaphragm-operated switch employed in the form of the invention shown in Fig. 4.

Referring more in detail to the drawing:

1 designates a circulating heater which includes a heating unit 2 enclosed in an outer casing 3. The heating unit has a combustion chamber 4 and an interconnected burner chamber 5 containing a burner or the like (not shown) for burning a suitable fuel to supply products of combustion which circulate in heating contact with the walls 6 of the combustion chamber before discharge through the flue outlet 7. The fuel supply to the burner is usually turned on and off responsive to temperature of the space being heated and is under control of a room thermostat arranged to operate a fuel control valve, indicated at 8, so that the heating unit is in operation only when the space being heated falls to a minimum low temperature and the fuel supply is turned off when the space being heated substantially reaches the desired temperature.

The outer casing 3 is spaced from the side walls and top of the combustion chamber to provide vertical passages 9 connected with a horizontal passageway 10 and forming a bonnet surrounding the combustion chamber and which is in connection with the space being heated.

In order that air may be drawn from the space heated and delivered through the passageways surrounding the combustion chamber, the lower portion of the casing is connected with an air circulating unit which includes a blower or fan 11. In the present instance, the fan 11 is shown as mounted within a chamber 12 formed within the lower portion of the casing and which has an air inlet opening 13 in connection with the space being heated. The opening 13 may be covered by a suitable filter 14. The fan or blower 11 includes a housing 15 having an air intake 16 opening from the chamber 12 and an outlet 17 through which air is discharged to the passageways 9. The housing 15 contains the usual fan or rotor element for effecting forced circulation of the air and is connected by a shaft 18 with a motor 19 supplied with electric current from the usual house service indicated by the wires 20 and 21 in Fig. 3.

The structure thus far described is representative of a conventional air circulating unit and specifically forms no part of the present invention but is illustrated and described to include a combustion chamber and an air circulating unit which form a part in the combination to which the present invention pertains.

As previously mentioned, the air circulators of this character are usually operated responsive to thermostats located within one of the air passageways in the bonnet and are activated by temperature of the circulated air that ordinarily has a high of approximately 160° during operation of the burner and a low approaching room temperature, or approximately 70°, thus providing a differential not exceeding 90°, after the burner has suspended operation and the combustion chamber has cooled. The relatively small differential between the high and low temperatures requires a very sensitive and delicate thermostat mechanism and necessitates a low voltage relay circuit for operating a switch controlling the higher voltage current necessary to operate the motor 19. It is obvious that the air flows through the passageways of the bonnet with considerable turbulence so that the air immediately surrounding the thermostat may fluctuate to cause erratical operation of the relay switch, with a result that the air circulating unit may be shut off before the heat units have been sufficiently extracted from the heating unit.

As soon as the circulation of the air is stopped the air in the space being heated starts to stratify, that is, the warm air rises to the ceiling and the cooler air settles to the floor. Therefore, the air within the level that people live becomes too chilly for comfort whereas the air at the upper level may be excessively warm. These conditions are not corrected until after the heating unit starts its next operating cycle and the air circulator is again rendered effective. The hot air at the upper level is again mixed with the cool air at the lower level, but the air is circulated through the heater with the result that the air may become too hot until after the circulating apparatus shuts down. The stratifying effect again takes place with the hot air rising to the ceiling. Thus, the temperature at the living level fluctuates over too wide a range for the health and comfort of the occupants.

The present invention, therefore, contemplates a more effective and satisfactory control of the air circulating unit responsive to the relatively wide differential of temperatures occurring within the combustion chamber; for example, assuming that the combustion chamber temperature when the burner is in operation reaches 800° and that the combustion chamber falls to approaching room temperature after the burner has suspended operation, an operating range of not less than 700° which may be utilized for operating a thermostat substantial and rugged enough to control the circuit supplying the motor of the air circulator unit. In order to utilize the wide differential of the combustion chamber temperatures, I provide a thermostat unit directly responsive to and operated by variations of combustion chamber heat.

In carrying out the present invention, the thermostat unit may be of various forms and adaptations as long as the heat responsive element thereof is of sturdy structure and supported so as to respond to variation in combustion chamber temperature. The simplest form of thermostat control comprises a relatively rugged bimetal thermostat blade 22 which is subjected to combustion chamber temperatures and shielded from the effects of the circulated air. The thermostat blade is preferably mounted so that one end 23 thereof is clamped in heat conductive contact with the wall 6 of the combustion chamber as indicated at 24. The end 25 of the blade projects alongside the combustion chamber and is subjected to radiated heat which acts in conjunction with the conducted heat to actuate the thermostat blade by a substantially wide range of heat variations thereby giving ample power to operate a control switch necessary to open and close directly the motor circuit.

If desired, the free end of the thermostat blade may carry one contact 26 of the switch as illustrated. The other contact 27 of the switch is supported by a flexible blade 28 having the lower end thereof insulated from the mounting of the thermostat blade by an insulator 29 and is adapted to be adjusted to and from the contact point carried by the thermostat blade so that the contacts engage at a predetermined temperature of the combustion chamber. This adjustment is affected by a screw 30 that is threadedly mounted in a bracket 31 carried by the insulator 29, the end of the screw 32 being adapted to act against the arm 28 so that the arm is moved to the desired position upon turning the head 33 of the screw. The insulator 39, including the means for clamping the thermostat blade in heat conductive contact with the wall of the combustion chamber may comprise a bracket 34 which forms the bottom of a housing cooperating with the wall of the combustion chamber to enclose and shield the thermostat blade and switch elements just described so that circulated air has relatively little effect upon the action of the thermostat blade. The portion of the housing cooperating with the bracket 34 may include a shield 36 having front, side, and top walls 36, 37, and 38 to form a compartment of ample size to contain the thermostat blade and switch elements and which have edges supported in contact with the wall of the combustion chamber as shown in Fig. 2.

Mounted within the housing and supported adjacent the contacts 26 and 27 is an insulating bracket 39 carrying binding posts 40 and 41 which are respectively connected by flexible conductors 42 and 43 with the contacts 27 and 26 so as to permit movement of the arm 28 and thermostat blade. Connected to the binding posts are conductors 44 and 45, one of which, for example the conductor 44, is directly connected with one of the service wires 21 and the other conductor 45 is connected with one of the terminals of the electric motor 19, the other terminal of the motor being connected with the other line wire 20 by a conductor 46 to complete the electric circuit through the motor.

In the form of the invention shown in Fig. 4, the thermostat consists of a bulb 47 containing an expansible liquid or gas and which is positioned at the side of the combustion chamber so that the bulb is responsive to variations in the temperature of the combustion chamber. To protect the bulb from the cooling effects of the air being circulated, a covering shield 48 may be used. Connected with the bulb is a tube 49 through which the expansible fluid acts upon a diaphragm within a diaphragm chamber 50 that is carried on a bracket 51 mounted in any convenient position preferably on the front of the heater casing as shown. The bracket 51 is contained within a housing 52 and pivotally mounts, as at 53, an arm 54 carrying a contact 55 adapted to bridge spaced contacts 56 and 57. The contacts 56 and 57 are insulated from each other and are connected by conductors 58 and 59 with a motor circuit in the manner of the conductors 44 and 45 previously referred to. The arm 54 is connected by a link 60 with a stem 61 attached to the diaphragm in the chamber 50 so that when the fluid in the bulb expands responsive to combustion chamber temperature, the diaphragm is actuated to rock the arm 54 to cause the contact 55 to close the gap between the contacts 56 and 57 and close the motor circuit to start operation of the air circulator. When the fluid contracts upon cooling of the combustion chamber the diaphragm moves in the opposite direction to move the arm 54 in the opposite direction, thereby opening the motor circuit to suspend forced circulation of the air through the heating unit. If desired, the desirable effects afforded by the thermostat may be promoted by enclosing the thermostat element in a body of heat retaining material 62 which preferably surrounds all sides of the thermostat element except the one adjacent the wall of the combustion chamber and may have a portion in heat conductive contact with the wall of the combustion chamber. With this arrangement, the heat is transmitted rapidly through the relatively thin wall of the combustion chamber and is stored up in the body of heat retention material, which being slow to cool off, holds the thermostat element at operating temperature over a longer period. Therefore, the air circulator is kept in operation for longer periods between operating periods of the heater unit. The prolonged circulation further retards tendency for the air to stratify in the space being heated; consequently, more uniform temperatures can be maintained at the level which people live in the space being heated.

While I have illustrated two forms of thermostat, it is obvious that other types of thermostats may be used as long as they are of a type to be operated in response to variations in combustion chamber temperatures.

It is obvious that by thus utilizing high operating temperature of the combustion chamber when the heating unit is in operation, an exceedingly wide range of temperature is secured in the thermostatic element itself permitting the employment of sturdy structure in both the switch and thermostat to control directly the current operating the motor.

It is also obvious that the invention provides for quick starting of the air circulator after the burner is started and also provides for continuing operation of the air circulator responsive to the stored heat after the burner has ceased operation. This, therefore, provides for longer operating periods of the air circulator and thus retards stratification of warm and cool air in the space being heated. As long as circulation continues, the warmer air at the ceiling is brought down to the space near the floor where people live and require the heat to keep them comfortable.

It is also obvious that when a bimetal type of thermostat blade is used as shown in Fig. 2, the blade is free and not subject to tension when the heater is out of operation.

What I claim and desire to secure by Letters Patent is:

1. In an air heater including a heating unit having an air contacting surface heated by products of combustion when the heating unit is in operation, a casing enclosing the heating unit to provide an air flow passageway around said heating unit, a fan for circulating air through said passageway in contact with the heated surface, a motor for actuating the fan, an electric switch having a thermal activating element, an electric circuit connecting the switch with the motor, means supporting the thermal activating element of said switch closely adjacent the heating unit to turn the fan on and off in response to variation in temperature of the heating unit, and an enclosure engaging said surface and having an enclosed space for the thermal activating element and separate from and unconnected with the passageway whereby the enclosure effectively prevents direct circulation of air over the thermal activating element.

2. In an air heater including a heating unit having an air contacting surface heated by products of combustion when the heating unit is in operation, a casing enclosing the heating unit to provide an air flow passageway around said heating unit, a fan for circulating air through said passageway in contact with the heated surface, a motor for actuating the fan, an electric switch having a thermal activating element, an electric circuit connecting the switch with the motor, means supporting the thermal activating element of said switch in direct heat conducting relation with the heated surface, and an enclosure for the thermal activating element and having contact with the heated area surrounding the thermal activating element to prevent effectively circulation of air over said thermal activating element whereby said thermal activating element is substantially solely responsive to stored heat.

3. In an air heater including a heating unit having an air contacting surface heated by products of combustion when the heating unit is in operation, a casing enclosing the heating unit to provide an air flow passageway around said heating unit, a fan for circulating air through said passgeway in contact with the heated surface, a motor for actuating the fan, an electric switch, an electric circuit connecting the switch and the motor for supplying electric current to the motor when the switch is closed, a thermostat bulb containing a heat responsive fluid, means supporting said bulb in heat conductive relation with the heated surface, means activated by said fluid to close said switch in response to the temperature of the heated surface, and an enclosure to prevent effectively direct circulation of air over the thermostat bulb and having a space for said bulb separate from and unconnected with respect to the passageway whereby said thermal element is substantially solely responsive to stored heat within said enclosure.

AMBROSE D. OLDS.

REFERENCES CITED

The following references are of record in the file of this patent:

UNITED STATES PATENTS

| Number | Name | Date |
|---|---|---|
| 1,558,848 | Doble | Oct. 27, 1925 |
| 1,667,027 | Boyce | Apr. 24, 1928 |
| 1,850,466 | Martin | Mar. 22, 1932 |
| 2,019,991 | Nilson | Nov. 5, 1935 |
| 2,186,988 | Osborne | Jan. 16, 1940 |
| 2,190,671 | McCollum | Feb. 20, 1940 |
| 2,191,174 | McCollum | Feb. 20, 1940 |
| 2,192,688 | McCollum | Mar. 5, 1940 |
| 2,230,612 | Crise | Feb. 4, 1941 |
| 2,295,841 | Hallinan | Sept. 15, 1942 |